(12) United States Patent
Wang et al.

(10) Patent No.: US 7,005,200 B2
(45) Date of Patent: Feb. 28, 2006

(54) METHOD FOR MANUFACTURING ARTICLES FOR HIGH TEMPERATURE USE, AND ARTICLES MADE THEREWITH

(75) Inventors: Hongyu Wang, Hockessin, DE (US); David Joseph Mitchell, Niskayuna, NY (US); Yuk-Chiu Lau, Ballston Lake, NY (US); Arnold Thomas Henry, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/040,796

(22) Filed: Jan. 14, 2005

(65) Prior Publication Data

US 2005/0287374 A1    Dec. 29, 2005

Related U.S. Application Data

(62) Division of application No. 10/065,260, filed on Sep. 30, 2002, now Pat. No. 6,866,897.

(51) Int. Cl.
*B32B 9/00* (2006.01)
*B32B 3/10* (2006.01)
*B32B 15/04* (2006.01)
*F03B 3/12* (2006.01)

(52) U.S. Cl. ............... 428/697; 428/699; 428/701; 428/702; 428/446; 428/469; 428/155; 416/241 B

(58) Field of Classification Search ............... 428/697, 428/701, 702, 699, 446, 448, 155, 469; 416/241 B
See application file for complete search history.

(56) References Cited

U.S. PATENT DOCUMENTS

| 5,759,932 A  * | 6/1998 | Sangeeta et al. ............... 501/85 |
| 5,869,146 A    | 2/1999 | McCluskey et al. |
| 6,254,935 B1   | 7/2001 | Eaton et al. |
| 6,365,288 B1 * | 4/2002 | Eaton et al. ................ 428/697 |
| 6,387,456 B1   | 5/2002 | Eaton, Jr. et al. |
| 2003/0003328 A1* | 1/2003 | Spitsberg et al. ........... 428/698 |
| 2003/0027012 A1* | 2/2003 | Spitsberg et al. ........... 428/615 |

* cited by examiner

*Primary Examiner*—Jennifer McNeil
(74) *Attorney, Agent, or Firm*—Paul J. DiConza; William E. Powell, III

(57) ABSTRACT

A method for manufacturing an article for use in a high-temperature environment, and an article for use in such an environment, are presented. The method comprises providing a substrate; selecting a desired vertical crack density for a protective coating to be deposited on the substrate; providing a powder, wherein the powder has a size range selected to provide a coating having the desired vertical crack density; and applying a thermal-sprayed coating to the substrate, the coating having the desired vertical crack density, wherein the powder is used as a raw material for the coating.

6 Claims, No Drawings

METHOD FOR MANUFACTURING ARTICLES FOR HIGH TEMPERATURE USE, AND ARTICLES MADE THEREWITH

This application is a division of application Ser. No. 10/065,260, filed Sep. 30, 2002, now U.S. Pat. No. 6,866,897 which is hereby incorporated by reference in its entirety.

FEDERAL RESEARCH STATEMENT

This invention was first conceived or reduced to practice in the performance of work under contract OEFCO2OOCH11047 with the United States Department of Energy. The United States of America may have certain rights to this invention.

BACKGROUND OF INVENTION

This invention relates to protective coatings for use in high temperature environments. More particularly, this invention relates to methods for manufacturing coated articles for use in high-temperature environments. This invention also relates to articles for use in such environments.

Materials used in high-temperature applications such as, for example, gas turbine engines, heat exchangers, internal combustion engines, and the like, are typically subjected to a potentially detrimental combination of heat, oxidative gas mixtures (including air, for instance), and other deleterious species such as water vapor. Protective coatings are often applied to component surfaces to prolong service lives and enhance performance. Thermal barrier coatings (TBC's) and environmental barrier coatings (EBC's) are two examples of protective coatings used in these and other applications. TBC's often comprise a layer of material, such as, for example, yttria-stabilized zirconia, having low thermal conductivity and high resistance to hot gas. EBC's are often used where the operating environment of a machine is corrosive or otherwise chemically detrimental to the materials comprising the bulk of key components. For example, U.S. Pat. No. 6,387,456 describes a method for applying an EBC to silicon based substrate materials, which have been proposed for use in high temperature applications. The EBC in this work comprised a barium-strontium aluminosilicate (BSAS) barrier layer, which protects the silicon-bearing substrate from environments containing high-temperature water vapor. Intermediate layers are also often applied between the substrate and EBC or TBC to provide enhanced adhesion, oxidation resistance, thermal expansion match, and the like.

EBC's and TBC's, which are generally ceramic materials, are often applied using thermal spray methods, including, for example, air plasma spraying, vacuum plasma spraying, and high velocity oxy-fuel (HVOF) spraying. The application of a high-performance, protective EBC or TBC presents a significant technical challenge, because the microstructure and properties of the finished coatings depend in large part on the process parameters used during the thermal spray application of the coating material. Such coatings are often required to possess a balance of competing properties such as, for example, high density and high tolerance for strain. Selection and control of thermal spray process parameters is thus an important aspect of the manufacture and repair of articles for use in high-temperature applications.

Therefore, there is a need to provide methods to control the microstructure and properties of protective thermal sprayed coatings, in order to improve the service lives and performance of high-temperature components. There is a further need for articles having enhanced performance in high-temperature applications.

SUMMARY OF INVENTION

Embodiments of the present invention address these and other needs. One embodiment is a method for manufacturing an article for use in a high-temperature environment, the method comprising providing a substrate; selecting a desired vertical crack density for a protective coating to be deposited on the substrate; providing a powder, wherein the powder has a size range selected to provide a coating having the desired vertical crack density; and applying a thermal-sprayed coating to the substrate, wherein the powder is used as a raw material for the coating. The coating has the desired vertical crack density.

A second embodiment is an article for use in high temperature environments, the article comprising a substrate comprising silicon; and an environmental barrier coating comprising barium aluminosilicate, wherein the coating comprises a vertical crack density of greater than about 4 cracks per linear centimeter.

DETAILED DESCRIPTION

In the method embodiments of the present invention, a substrate is provided. In certain embodiments, the provided substrate comprises a material that comprises silicon, for example, at least one of a silicon-containing ceramic and a silicon-containing metal alloy. Examples of suitable ceramics include, but are not limited to, fiber-reinforced composite materials, such as composites comprising silicon carbide. In certain embodiments, providing the substrate further comprises providing a component of a gas turbine assembly, and many silicon-containing materials are susceptible to degradation at the temperatures commonly used for such applications, where the environment contains water vapor, thus the application of protective barrier coatings is desirable.

A desired vertical crack density is selected for the protective coating to be deposited on the substrate. The presence of vertical cracks (that is, cracks running along the entire cross-sectional thickness of a coating from a first interface at the deposition surface to a second, opposing interface) in thermal sprayed coatings advantageously enhances the compliance of the coating, allowing the coating to tolerate higher amounts of strain before failure than dense coatings of the same material. However, vertical cracks detract from the ability of the coating to isolate the substrate from the environment, thus reducing the protective properties of, for example, an EBC. Therefore, those skilled in the art will appreciate that the selection of a desired vertical crack density is based upon an optimization of competing properties, such as, for example, compliance versus barrier effectiveness. In certain applications, the strain tolerance of an EBC may be highly important, to the point where its protective properties may be sacrificed somewhat to attain higher compliance. In such cases, a certain allowable range of vertical cracks may be specified. One method in the art for quantifying vertical cracks is to examine a given length of cross-sectioned, coated substrate; count the number of vertical cracks present in this known length, and calculate the ratio of number of cracks per unit length of cross section. This ratio is referred to herein as "vertical crack density." In some embodiments, selecting the desired vertical crack density comprises selecting a vertical crack density from about 0 cracks per linear centimeter of coating to about 30 cracks per linear centimeter of coating. In certain embodiments, selecting the vertical crack density comprises selecting a vertical crack density from about 0 cracks per linear centimeter of coating to about 12 cracks per linear centimeter of coating.

The method of the present invention further comprises providing a powder. As used herein, the term "powder" refers to a population of individual particles, wherein each individual particle has a diameter, also referred to herein as a "particle size." The powder, as a population, has a statistical distribution of individual particle sizes ("particle size distribution"). According to embodiments of the present invention, powder is provided, wherein the powder has a particle size distribution selected to provide a thermal spray coating having the aforementioned desired vertical crack density. The present inventors have discovered that by controlling the particle size distribution of the powder used as raw material in a thermal spray process, the vertical crack density of the resultant coating can be controlled over a wide range, including crack densities down to about 0 cracks per linear centimeter. The ability to control coating microstructure by controlling particle size distribution gives an additional degree of freedom in the thermal spray processing of ceramic barrier coatings, including EBC's and TBC's.

The present inventors discovered that the vertical crack density of a thermal sprayed barrier coating, such as an EBC, is related to the amount of relatively small-diameter particles (particles with diameters less than about 44 micrometers) in the powder used to process the coating in general, for a given set of thermal spray processing conditions, powders with fewer small-diameter particles yield coatings with lower vertical crack densities. Thus, according to embodiments of the present invention, the vertical crack density of a thermal sprayed barrier coating can be controlled by specifying a particular size distribution of the powder used to process the coating.

Particle size distributions are often characterized in the industry by determining values for particle diameters at certain points in the cumulative particle size distribution of the powder. For example, a particle size distribution may be specified by reporting the diameters corresponding to the tenth, fiftieth, and ninetieth percentile points in the cumulative particle size distribution; illustratively, about ten percent of the powder by volume therefore comprises particles having diameters less than this tenth percentile diameter value.

Embodiments of the present invention include instances wherein providing the powder comprises providing a powder having a particle size distribution, wherein about 10 volume percent of the powder comprises particles having diameters less than a tenth percentile diameter value in the range from about 25 micrometers to about 50 micrometers, about 50 volume percent of the powder comprises particles having diameters less than a fiftieth percentile diameter value in the range from about 50 micrometers to about 70 micrometers, and about 90 volume percent of the powder comprises particles having diameters less than a ninetieth percentile diameter value in the range from about 85 micrometers to about 105 micrometers.

In certain embodiments, providing the powder comprises providing a powder having a particle size distribution wherein the tenth percentile diameter value is in the range from about 25 micrometers to about 30 micrometers, the fiftieth percentile diameter value is in the range from about 50 micrometers to about 55 micrometers, and the ninetieth percentile diameter value is in the range from about 85 micrometers to about 90 micrometers. This size distribution corresponds, for example, to powders that are presently commercially available (herein referred to as "baseline grade powder") for thermal spray processing of environmental barrier coatings comprising barium strontium aluminosilicate.

In alternative embodiments, the size distribution of the powder is generally coarser than the aforementioned baseline grade. The coarser powder may be obtained, for example, by passing baseline grade powder through at least one sieve, by selective air classification, or by other methods commonly used in the art. According to these embodiments, providing the powder comprises providing a powder having a size distribution wherein the tenth percentile diameter value is in the range from about 35 micrometers to about 50 micrometers, the fiftieth percentile diameter value is in the range from about 55 micrometers to about 70 micrometers, and the ninetieth percentile diameter value is in the range from about 85 micrometers to about 105 micrometers.

In certain embodiments pertinent to the use of coarser powder, providing the powder comprises providing a powder (herein referred to as class A powder) having a particle size distribution wherein the tenth percentile diameter value is in the range from about 35 micrometers to about 45 micrometers, the fiftieth percentile diameter value is in the range from about 55 micrometers to about 65 micrometers, and the ninetieth percentile diameter value is in the range from about 85 micrometers to about 90 micrometers. In other embodiments, providing the powder comprises providing a powder (herein referred to as class B powder) having a particle size distribution wherein the tenth percentile diameter value is in the range from about 45 micrometers to about 50 micrometers, the fiftieth percentile diameter value is in the range from about 60 micrometers to about 70 micrometers, and the ninetieth percentile diameter value is in the range from about 95 micrometers to about 105 micrometers. As described above, the use of powder, such as, for example, class B powder, having particle size distributions that are coarse relative to the aforementioned baseline grade generally result in coatings having relatively lower vertical crack densities, when used in accordance to embodiments of the present invention.

In some embodiments, providing the powder comprises providing a material capable of forming an environmental barrier layer to protect the substrate from a high temperature, chemically aggressive environment; examples of such a material include, for example, a ceramic material. In particular embodiments, providing the ceramic material comprises providing a material comprising barium strontium aluminosilicate (BSAS), the aforementioned material commonly used to manufacture EBC's to protect silicon-containing substrates from high temperature environments containing water vapor. In alternative embodiments, providing the powder comprises providing a material, such as, for example, a ceramic, capable of forming a thermal barrier layer to protect the substrate from a high temperature environment. In particular embodiments, providing the ceramic material comprises providing a material comprising yttria-stabilized zirconia.

A thermal-sprayed coating is applied to the substrate, wherein the aforementioned powder is used as a raw material for the coating. As is well known in the art, the powder is fed at a controlled rate into a thermal spray torch, whereupon the particles are heated (often to beyond the melting point of the material from which they are made) and entrained within a gas flow, whereupon they impinge upon the surface of the substrate to coalesce and form a coating. Any of several thermal spray techniques are suitable for applying the coating. In some embodiments of the present invention, applying the thermal-sprayed coating comprises applying the coating using at least one of air plasma spraying, vacuum plasma spraying, and high-velocity oxy-fuel spraying. The thickness of the coating is selected to provide adequate protection for the particular environment and desired service life of the substrate being coated. In certain embodiments, applying the thermal-sprayed coating comprises applying a coating having a thickness of greater than about 20 micrometers. In particular embodiments, applying the thermal-sprayed coating comprises applying a coating having a thickness in the range from about 100 micrometers to about 1500 micrometers. To further enhance the effectiveness of the protective thermal-sprayed coating, the method of the present invention, in some embodiments, further comprises applying at least one intermediate layer onto the substrate prior to applying the thermal-sprayed coating. The at least one intermediate layer is applied to the substrate by any of several methods, including, for example, any of the thermal spray methods listed above. In some embodiments, applying the at least one intermediate layer comprises applying at least one layer comprising mullite, and in further embodiments, applying the at least one intermediate layer comprises applying at least one layer comprising silicon, such as, for example, a silicate compound. Intermediate layers provide enhanced adhesion between the protective coating and the substrate and, in some instances, prevent reactions between the substrate and the protective coating.

In order to further enhance the adhesion of the thermal-sprayed coating to the substrate, the method of the present invention, in certain embodiments, further comprises heat treating the substrate after applying the thermal-sprayed coating. Heat-treating the coating provides conversion of the coating to an appropriate crystal structure. In the case of BSAS, the as-sprayed coating has a crystal structure that is a combination of amorphous and hexacelsian structure. During heat-treatment, the coating is transformed to >50% monoclinic celsian phase. The coating gains strength after heat-treatment and the celsian phase has a coefficient of thermal expansion (CTE) that is more similar to the silicon-containing substrate ($\sim 5\times 10^{-6}/C$) than the hexacelsian phase ($\sim 8\times 10^{-6}/C$). In particular embodiments, heat-treating comprises heating said substrate to a temperature in the range from about 1200° C. to about 1400° C. for a time in the range from about 15 minutes to about 100 hours. In certain instances, the heat treatment is performed in flowing air in order to ensure that oxygen reduction does not occur in the oxide-based coating.

In order to further exploit the advantages of embodiments of the present invention, certain embodiments of the present invention include a method for manufacturing an article for use in a high-temperature environment, the method comprising: providing a substrate comprising silicon; selecting a desired vertical crack density for an environmental barrier coating to be deposited on the substrate; providing a powder comprising barium strontium aluminosilicate, wherein the powder has a size range selected to provide a coating having the desired vertical crack density; and applying a thermal-sprayed coating to the substrate, the coating having the desired vertical crack density, wherein the powder is used as a raw material for the coating.

Embodiments of the present invention also include an article for use in high temperature environments, the article comprising a substrate comprising silicon, and an environmental barrier coating (EBC) comprising barium alumino-silicate, wherein the coating comprises a vertical crack density of greater than about 4 cracks per linear centimeter. Although the presence of vertical cracks in the EBC reduces its barrier properties, the reduction may be offset somewhat by the increase in strain tolerance of the EBC due to the vertical cracks. In certain applications, such a tradeoff may be desirable, in that increased strain tolerance of the EBC may increase the overall lifetime of the component, despite the somewhat reduced protective capability. If the cracks are narrow and are not held open during exposure to corrosive gases, the protective capability of the coating may not be diminished to the point of inadequacy. In certain embodiments, the vertical crack density is in the range from about 4 cracks per linear centimeter of coating to about 12 cracks per linear centimeter of coating.

In certain embodiments, the substrate comprises at least one of a ceramic comprising silicon, such as, for example, silicon carbide; and a silicon-containing metal alloy. In particular embodiments, the substrate comprises a fiber-reinforced composite material, such as for example, a material comprising a matrix comprising silicon (such as, for example, silicon carbide, silicon nitride, or silicon) and a fiber-reinforcement, such as, for example, carbon fiber or silicon carbide fiber. Suitable examples of silicon-containing metal alloys include niobium-silicon alloys and molybdenum-silicon alloys. As in the method embodiments described above, in certain embodiments the substrate comprises a component of a gas turbine assembly.

As described above, intermediate layers are often used in EBC systems to enhance the performance of the coating. Accordingly, in certain embodiments of the present invention, the article further comprises at least one intermediate layer disposed between said substrate and said environmental barrier coating, and in particular embodiments, the at least one intermediate layer comprises at least one of mullite and silicon. Other aspects of the article, such as coating thickness, for example, are consistent with the descriptions above for the method of the present invention.

EXAMPLE

The following example is included to describe exemplary embodiments of the present invention and should not be considered as limiting the invention in any way.

Each of a baseline grade BSAS powder, a BSAS class A powder, and a BSAS class B powder was air plasma sprayed according to the parameters in Table 1 onto substrates made of a melt-infiltrated silicon fiber-reinforced silicon/silicon carbide composite.

TABLE 1

| Coating layer | I | II | III |
|---|---|---|---|
| Powder | Si | Mullite/BSAS | BSAS |
| Powder size (mesh size) | −100 + 325 | | −200 + 325 |
| Coating passes | 15 | 18 | 20 |
| Ar Primary Gas, scfh | 80 | 80 | 80 |
| H Secondary Gas, scfh | 5–8 | 8–11 | 6–9 |
| Ar Carrier Gas, scfh | 10 | 12 | 12 |
| Gun current, A | 650 | 700 | 540 |
| Gun voltage, V | 44 | 49 | 46 |
| Gun power, kW | 29 | 34 | 25 |
| Powder food rate, kg/hr | 1 | 1 | 0.5 |
| Spray distance, cm | 10 | 8 | 13 |
| Gun speed, mm/s | 600 | 1000 | 600 |

Prior to deposition of the BSAS material (coating layer III in Table 1), the substrates were coated with from about 50 micrometers to about 100 micrometers of silicon (coating layer I) and from about 50 micrometers to about 100 micrometers of a layer comprising a mixture of BSAS and mullite (coating layer II). After all coatings were deposited, the specimens were heat treated at about 1250° C. for about 24 hours in flowing air. The specimens were then sectioned and metallographically examined to measure vertical crack density. The results showed a clear relationship between vertical crack density and powder size distribution. The coatings produced using baseline grade powder had the highest vertical crack density of the three grades tested, at about 7 cracks per linear centimeter. Coatings produced using class B powder, with an amount of fine particles intermediate to that of baseline grade and class A powder, had about 4 cracks per linear centimeter, and those produced using class A powder, with the smallest amount of fine particles, had about 0 cracks per linear centimeter.

While various embodiments are described herein, it will be appreciated from the specification that various combinations of elements, variations, equivalents, or improvements therein may be made by those skilled in the art, and are still within the scope of the invention as defined in the appended claims.

The invention claimed is:

1. An article for use in high temperature environments, said article comprising:
   a substrate comprising silicon; and
   an environmental barrier coating comprising barium aluminosilicate, wherein said coating comprises a vertical crack density in the range from about 4 cracks per linear centimeter of coating to about 12 cracks per linear centimeter of coating.

2. The article of claim 1, wherein said substrate comprises at least one of a silicon-containing ceramic and a silicon-containing metal alloy.

3. The article of claim 2, wherein said substrate comprises a fiber-reinforced composite material.

4. The article of claim 1, wherein said substrate comprises a component of a gas turbine assembly.

5. The article of claim 1, further comprising at least one intermediate layer disposed between said substrate and said environmental barrier coating.

6. The article of claim 5, wherein said at least one intermediate layer comprises at least one of mullite and silicon.

* * * * *

UNITED STATES PATENT AND TRADEMARK OFFICE
CERTIFICATE OF CORRECTION

PATENT NO. : 7,005,200 B2 Page 1 of 1
APPLICATION NO. : 11/040796
DATED : February 28, 2006
INVENTOR(S) : Hongyu Wang and David Joseph Mitchell It is certified that error appears in the above-identified patent and that said Letters Patent is hereby corrected as shown below:

Replace column 1, line 13 with the following:

--DOE-FC36-00CH11047 with the United States Department of--

Signed and Sealed this

Twenty-ninth Day of May, 2007

JON W. DUDAS
*Director of the United States Patent and Trademark Office*